(12) United States Patent
Funk et al.

(10) Patent No.: US 6,393,815 B1
(45) Date of Patent: May 28, 2002

(54) PLENUM FOR TILTABLE CUTTING DECK

(75) Inventors: Edric C. Funk, Blaine; Gerald Damgard, Northfield; Matthew J. Decker, Lakeville; Andre A. Sheats, Blaine, all of MN (US)

(73) Assignee: The Toro Company, Minneapolis, MN (US)

( * ) Notice: Subject to any disclaimer, the term of this patent is extended or adjusted under 35 U.S.C. 154(b) by 0 days.

(21) Appl. No.: 09/659,345

(22) Filed: Sep. 12, 2000

(51) Int. Cl.[7] .................................. A01D 67/00
(52) U.S. Cl. ........................ 56/320.2; 56/202
(58) Field of Search ................ 56/320.2, 202, 56/13.3, 16.6, 12.9, 14.7

(56) References Cited

U.S. PATENT DOCUMENTS

| | | | | |
|---|---|---|---|---|
| 3,750,378 A | * | 8/1973 | Thorud et al. | 56/10.5 |
| 3,949,540 A | * | 4/1976 | Christopherson et al. | 56/202 |
| 4,047,367 A | * | 9/1977 | Thorud | 56/202 |
| 4,245,455 A | * | 1/1981 | Martin | 56/12.8 |
| 4,345,416 A | * | 8/1982 | Cameron | 56/13.3 |
| 4,726,178 A | * | 2/1988 | Mallaney et al. | 56/202 |
| 4,735,037 A | * | 4/1988 | Benter | 56/13.3 |
| 5,189,870 A | * | 3/1993 | Hohnl | 56/320.2 |
| 5,560,188 A | * | 10/1996 | Murakawa et al. | 56/13.3 |
| 5,669,212 A | * | 9/1997 | Bening et al. | 56/13.3 |

FOREIGN PATENT DOCUMENTS

| | | | | |
|---|---|---|---|---|
| DE | 2838368 | * | 3/1980 | 56/320.2 |
| FR | 2423968 | * | 12/1979 | 56/320.2 |
| FR | 2470524 | * | 6/1981 | 56/202 |
| GB | 2196825 | * | 5/1988 | 56/202 |

OTHER PUBLICATIONS

Toro Z–Master 48" Collection System Parts Catalog, dated 1998.

* cited by examiner

*Primary Examiner*—Robert E. Pezzuto
*Assistant Examiner*—Arpád Fáb Kovács
(74) *Attorney, Agent, or Firm*—James W. Miller

(57) ABSTRACT

A mower comprises a frame having a cutting deck which is tiltable relative to the frame. The cutting deck has a substantially horizontal operating position and a generally upright transport or service position, the cutting deck tilting to move between the horizontal and upright positions. A blower is carried on the frame and a plenum connects the blower and the cutting deck. A grass discharge outlet on the cutting deck is telescopically inserted into the front of the plenum as the cutting deck is moved into its operating position. A guide pin is received in a slot having a V-shaped portion and a straight portion to correct misalignment between the cutting deck and the plenum as the two are telescoped together. The rear of the plenum can be manually attached to or released from the blower inlet without using tools.

20 Claims, 7 Drawing Sheets

PLENUM FOR TILTABLE CUTTING DECK

TECHNICAL FIELD

This invention relates to a plenum for connecting the grass discharge outlet on a tiltable cutting deck of a mower to the inlet of a blower.

BACKGROUND OF THE INVENTION

Outfront rotary mowers have a cutting deck coupled to the front of the mower frame. The cutting deck encloses one or more rotary blades for severing grass. The grass clippings are discharged from the cutting deck through a plenum to the inlet of a blower carried on the mower frame. The blower discharges the grass clippings to a grass collecting hopper or the like.

Mowers of this type are often used by commercial contractors who mow large areas of grass. The mowers are thus often transported on trailers from one job site to another. To decrease the amount of space required for the mower during transport on the trailer, most mowers of this type have a cutting deck that can be tilted upright relative to the mower frame. When the cutting deck is tilted into this upright transport position, the cutting deck/mower combination takes considerably less space on the trailer. In addition, the upright position is also useful for service purposes to provide easy access to the bottom of the cutting deck to more easily change blades or the like. Thus, the upright position can be considered as either a transport or service position of the cutting deck in contrast to the horizontal operating position of the cutting deck.

In mowers of this type, the plenum that connects the cutting deck to the blower inlet is usually part of or carried with the cutting deck. Thus, when the cutting deck is being moved back down from its upright transport or service position to its horizontal operating position, the plenum has to reengage the inlet of the blower. This task is complicated since the orientation and movement of the cutting deck relative to the blower inlet can make it difficult to insert the plenum into the blower inlet. Prior art mowers have attempted to solve this problem by using various springs and guides to help guide the plenum into the blower inlet, but this adds additional parts and expense to the mower.

In addition, in prior art mowers, the plenum can sometimes become clogged with grass clippings. It is difficult and time consuming in such products to clear the plug from the plenum due to the plenum design. Accordingly, an easier and less burdensome way of getting access to the plenum would be desirable.

SUMMARY OF THE INVENTION

One aspect of this invention relates to a mower which comprises a frame. A tiltable cutting deck is coupled to the frame, the cutting deck being tiltable between a generally horizontal operating position and a generally vertical transport or service position. The cutting deck has a grass discharge outlet. A blower having a blower inlet is carried on the frame. A plenum connects the cutting deck and the blower. The plenum has a plenum inlet that is coupled to the grass discharge outlet of the cutting deck and a plenum outlet that is coupled to the blower inlet when the cutting deck is in the operating position. The grass discharge outlet disengages the plenum inlet when the cutting deck is moved from its operating position to its transport or service position while the plenum outlet remains coupled to the blower inlet.

Another aspect of this invention relates to a mower which comprises a frame. A tiltable cutting deck is coupled to the frame, the cutting deck being tiltable between a generally horizontal operating position and a generally vertical transport or service position. The cutting deck has a grass discharge outlet. A blower having a blower inlet is carried on the frame. A plenum is provided that is separate from the cutting deck and the blower. The plenum has a plenum inlet that is coupled to the grass discharge outlet of the cutting deck and a plenum outlet that is coupled to the blower inlet when the cutting deck is in the operating position. The plenum outlet is releasably coupled to the blower inlet.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
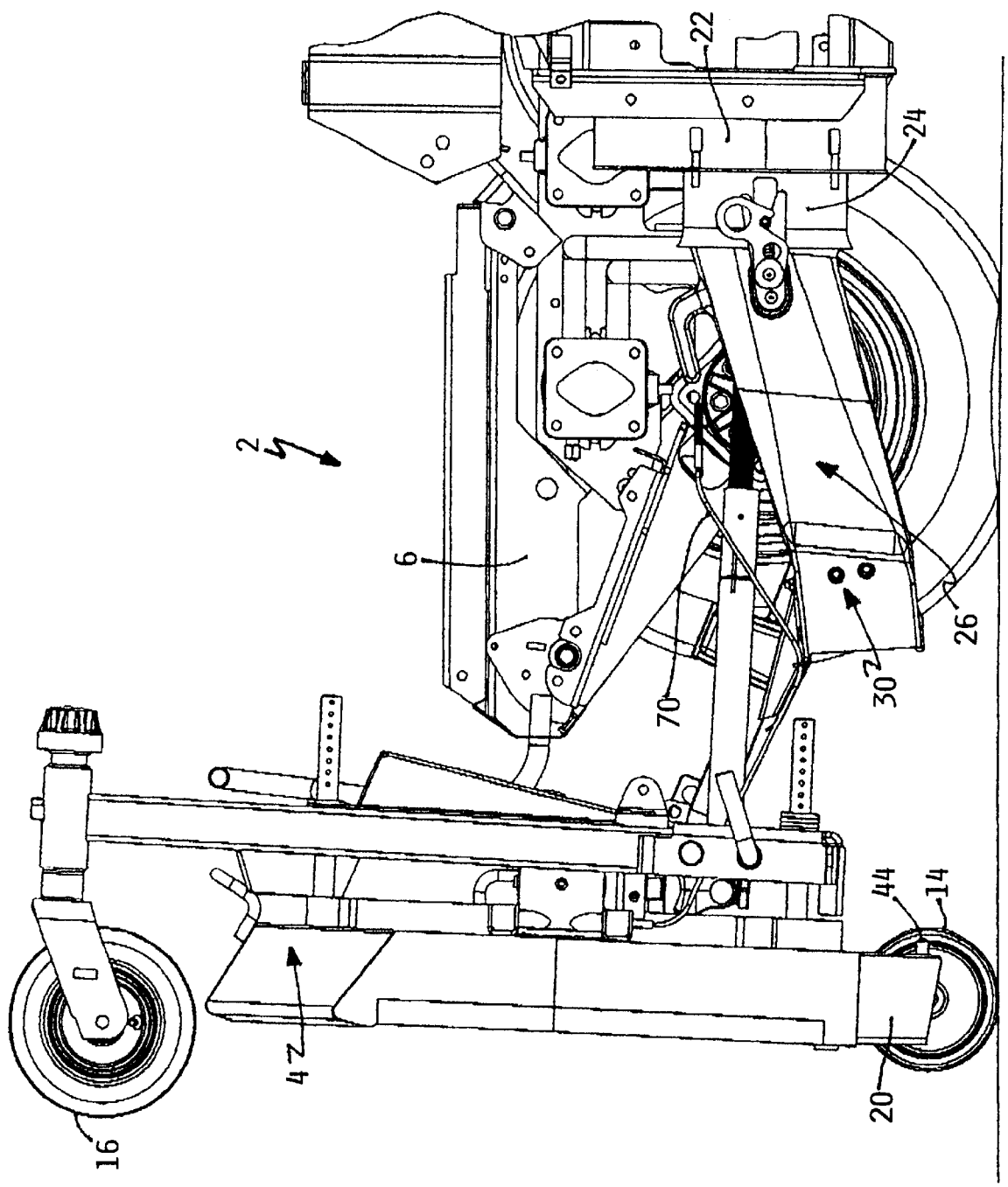
FIG. 1 is a side elevational view of a portion of a mower having a tiltable cutting deck, particularly illustrating the cutting deck in a tilted, fully upright, transport or service position with the grass discharge outlet on the cutting deck shown being disconnected from the plenum leading to the blower housing on the mower.

FIG. 1 shows a portion of a mower 2 having a tiltable cutting deck 4. Cutting deck 4 is coupled to one side of the frame 6 of mower 2. For mower 2 shown in FIG. 1, cutting deck 4 is coupled to the front of mower frame 6. In addition, cutting deck 4 includes one or more cutting blades (not shown). Each cutting blade is rotatable within cutting deck 4 about a substantially vertical axis such that the cutting blades rotate in substantially horizontal cutting planes when cutting deck 4 is being used to cut grass. Thus, mower 2 shown in FIG. 1 represents what is known in the art as an "out front rotary" mower. Such a mower can be a riding mower on which a seated operator is carried on mower frame 6, such as the Z Master Outfront ZRT mowers manufactured and sold by The Toro Company, the assignee of this invention.

Figure 2:
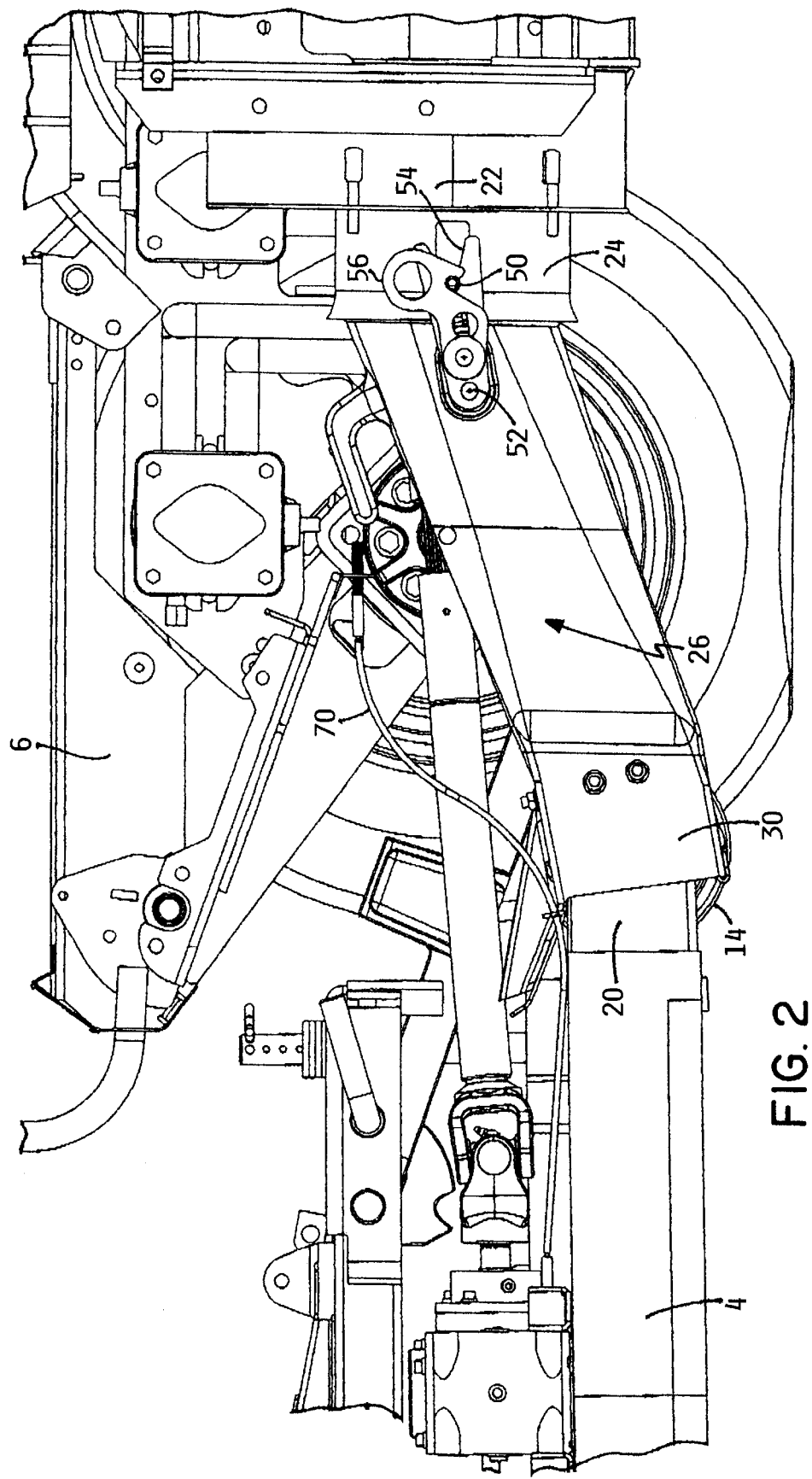
FIG. 2 is an enlarged side elevational view of a portion of the mower and cutting deck shown in FIG. 1, with FIG. 2 particularly illustrating the cutting deck in a non-tilted, generally horizontal, working position with the grass discharge outlet on the cutting deck shown being connected to the plenum leading to the blower housing on the mower.

Cutting deck 4 can be tilted relative to mower 2 between an operating position shown in FIG. 2 and a transport or service position shown in FIG. 1. In the operating position, cutting deck 4 is substantially horizontal and parallel to the ground to cut grass when cutting deck 4 is propelled forwardly by mower 2. In the transport or service position, cutting deck 4 is tilted approximately 90° relative to its operating position so that it is now vertically upright with the underside of cutting deck 4 being exposed and facing forwardly. Cutting deck 4 is placed into the transport or service position when mower 2 is not in use and, typically, when mower 2 is being transported on a trailer. One purpose for the transport or service position is to decrease the amount of transport space needed for mower 2 and cutting deck 4 during transport. Another purpose for the transport or service position is to provide easy access to the bottom of cutting deck 4 to enable service activities such as changing blades or cleaning.

Mowers with tiltable cutting decks of this type are well known in the art. Cutting deck 4 can be moved between its operating and transport or service positions using any suitable linkages and actuator. For example, a hydraulic actuator (not shown) can be used. When the hydraulic actuator is extended, the forward force on cutting deck 4 causes cutting deck 4 to pivot or tilt upwardly with rear guide wheels 14 provided on the rear of cutting deck 4 coming into engagement with the ground or trailer floor during the tilting operation. However, any suitable mechanical structure for pivotally supporting cutting deck 4 on mower 2 and for tilting cutting deck 4 between its operating and transport or service positions could be used. For example, cutting deck 4 can be pivotally mounted on mower 2 and could be manually lifted and lowered between its horizontal operating position and its vertical storage or service position. The front of cutting deck 4 includes front wheels 16 that engage the ground in the operating position of cutting deck 4 to support cutting deck 4 for rolling over the ground as cutting deck 4 is propelled forwardly by mower 2. Cutting deck 4 can move independently of mower frame 6 to conform to the ground contours. This "floating" or "ground contour following" capability of cutting deck 4 is well known in the art and need not be further described herein.

Cutting deck 4 includes a rearwardly facing grass discharge outlet 20 in the shape of a short, generally rectangular duct. A blower 22 is carried on mower frame 6 and has a forwardly facing blower inlet 24. A plenum 26 connects grass discharge outlet 20 on cutting deck 4 to blower inlet 24 on mower frame 6. When cutting deck 4 is operating to cut grass and blower 22 on mower 2 is also operating, the grass clippings flow from cutting deck 4 through plenum 26 and through blower 22. Blower 22 typically discharges the grass clippings into some type of grass collecting hopper (not shown). This invention relates to an improved plenum 26.

Plenum 26 of this invention is separate both from grass discharge outlet 20 and from blower 22. Plenum 26 comprises a generally rectangular duct 28 having a forwardly facing inlet 30 and a rearwardly facing circular outlet 32. Plenum inlet 30 tapers outwardly as it extends forwardly and is sized to receive grass discharge outlet 20 in a telescopic fit. Plenum outlet 32 is sized to itself be telescopically received in blower inlet 24. Plenum 26 is not straight between its inlet 30 and outlet 32, but has outlet 32 offset to one side from inlet 30 because blower 22 is set to one side on mower frame 6 relative to grass discharge outlet 20 which is preferably centrally located on cutting deck 4. However, if grass discharge outlet 20 and blower 22 were on the same longitudinal line with one another, then plenum 26 would be straight between its inlet 30 and outlet 32.

Figure 6:
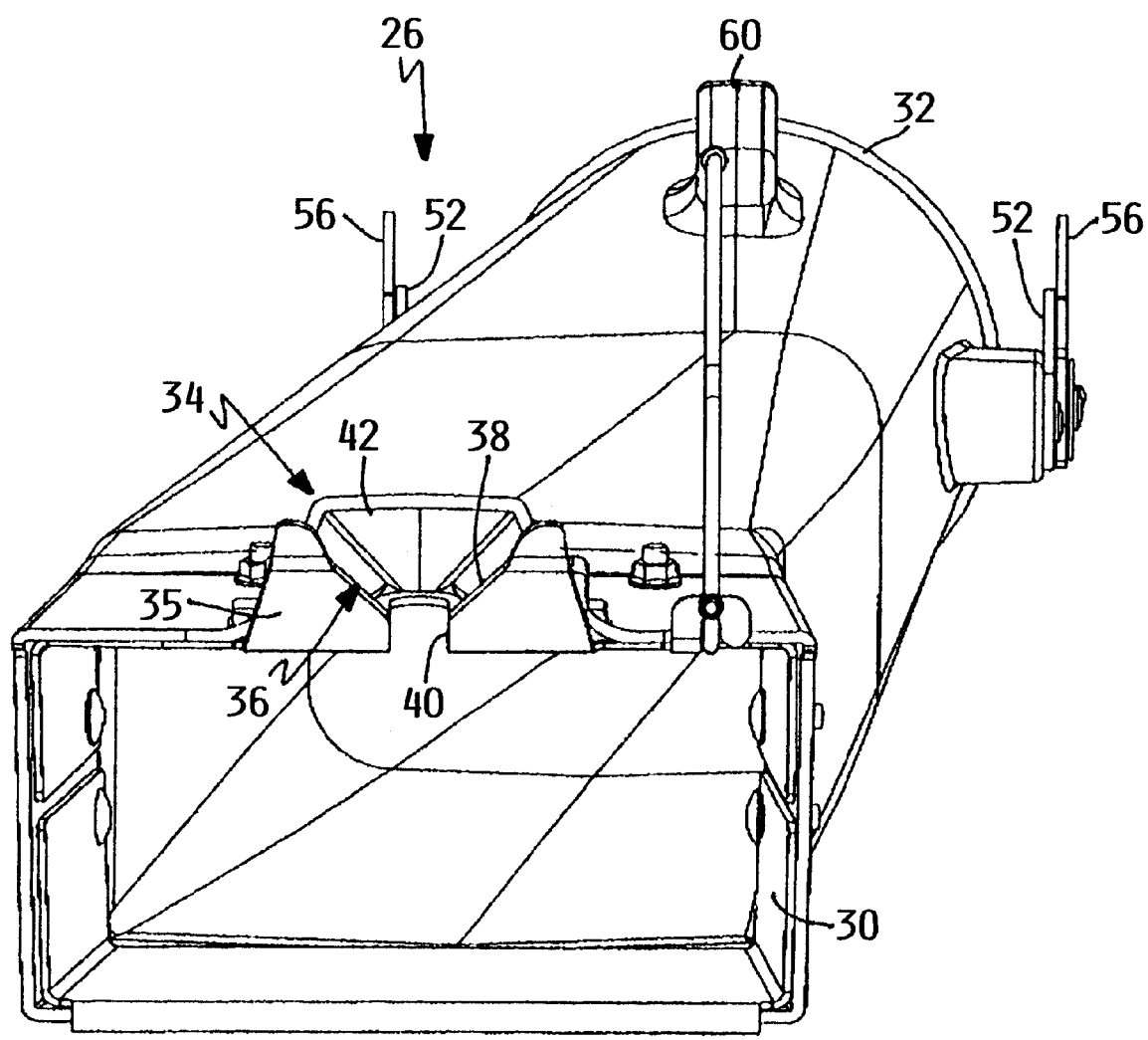
FIG. 6 is a front plan view of the plenum shown in FIG. 5.

Plenum 26 and cutting deck 4 include a guide 34 for helping align grass discharge outlet 20 on cutting deck 4 with plenum inlet 30 as cutting deck 4 is moved from its transport or service position into its operating position. Guide 34 includes a cam 35 located on plenum 26 adjacent plenum inlet 30. Cam 35 includes a pin receiving slot 36 having a forwardly and upwardly extending V-shaped portion 38 and a rearwardly extending straight portion 40. See FIG. 6. Guide 34 also includes a cover 42 overlying slot 36. Finally, guide 34 includes an upwardly extending guide pin 44 carried on the rear of grass discharge outlet 20 on cutting deck 4.

Figure 3:
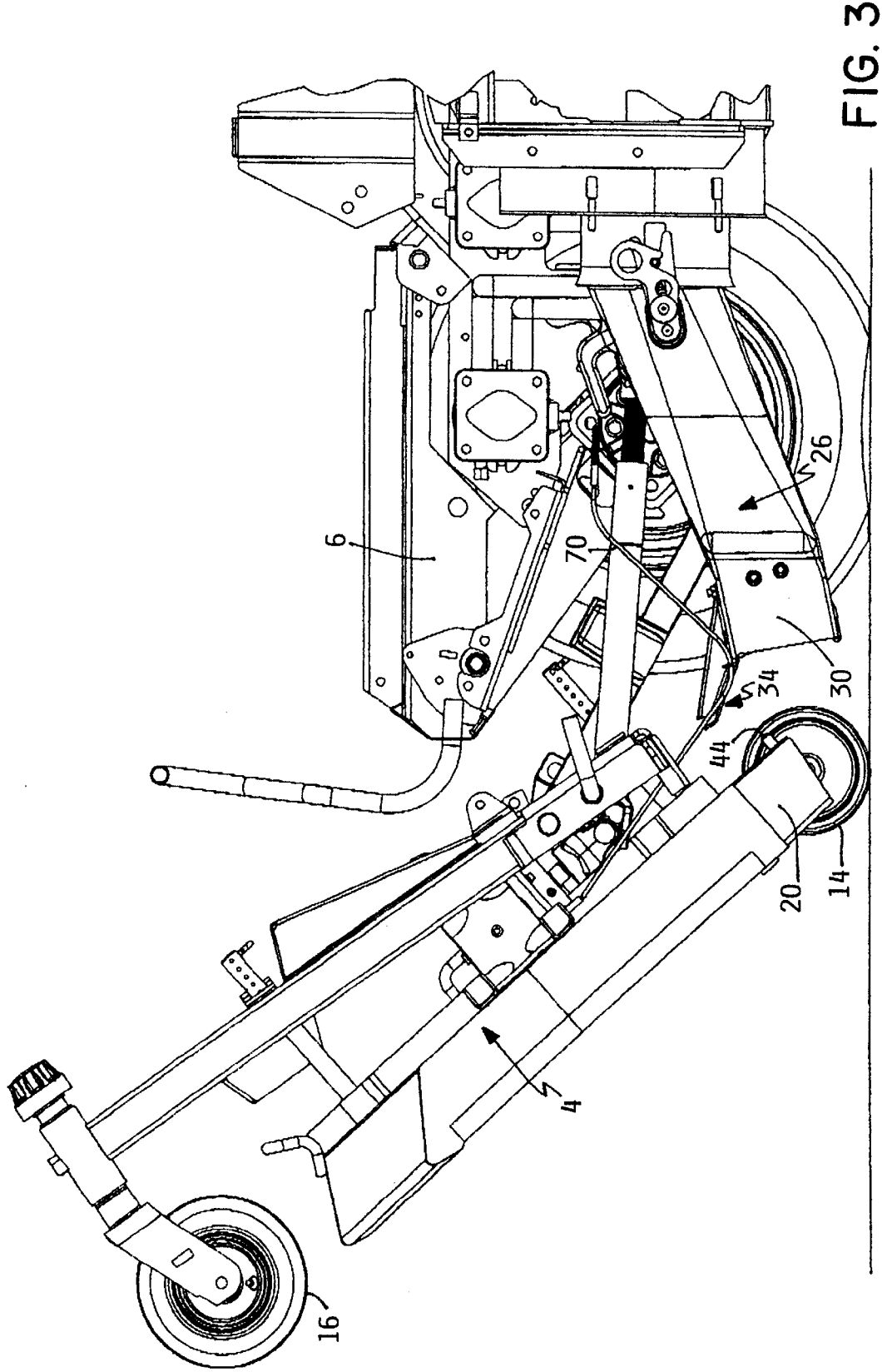
FIG. 3 is a side elevational view of the mower and cutting deck shown in FIG. 1, with FIG. 3 particularly illustrating the cutting deck in a partially tilted, partially upright position between the storage and working deck positions shown in FIGS. 1 and 2.
Figure 4:
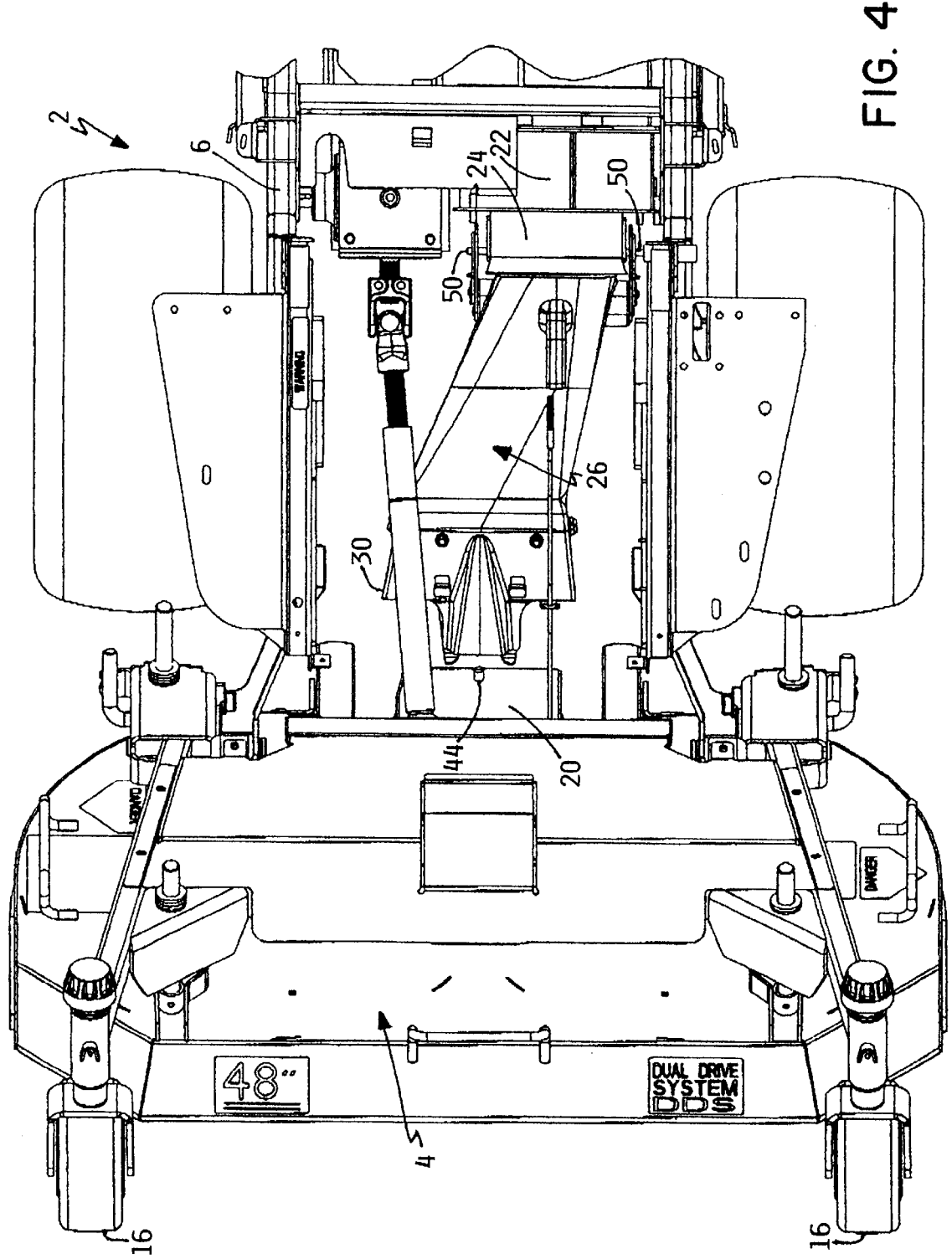
FIG. 4 is a top plan view of the mower and cutting deck shown in FIG. 1, with FIG. 4 particularly illustrating the mower and cutting deck from above when the mower and cutting deck are disposed in the partially tilted, partially upright position shown in FIG. 3.
Figure 5:
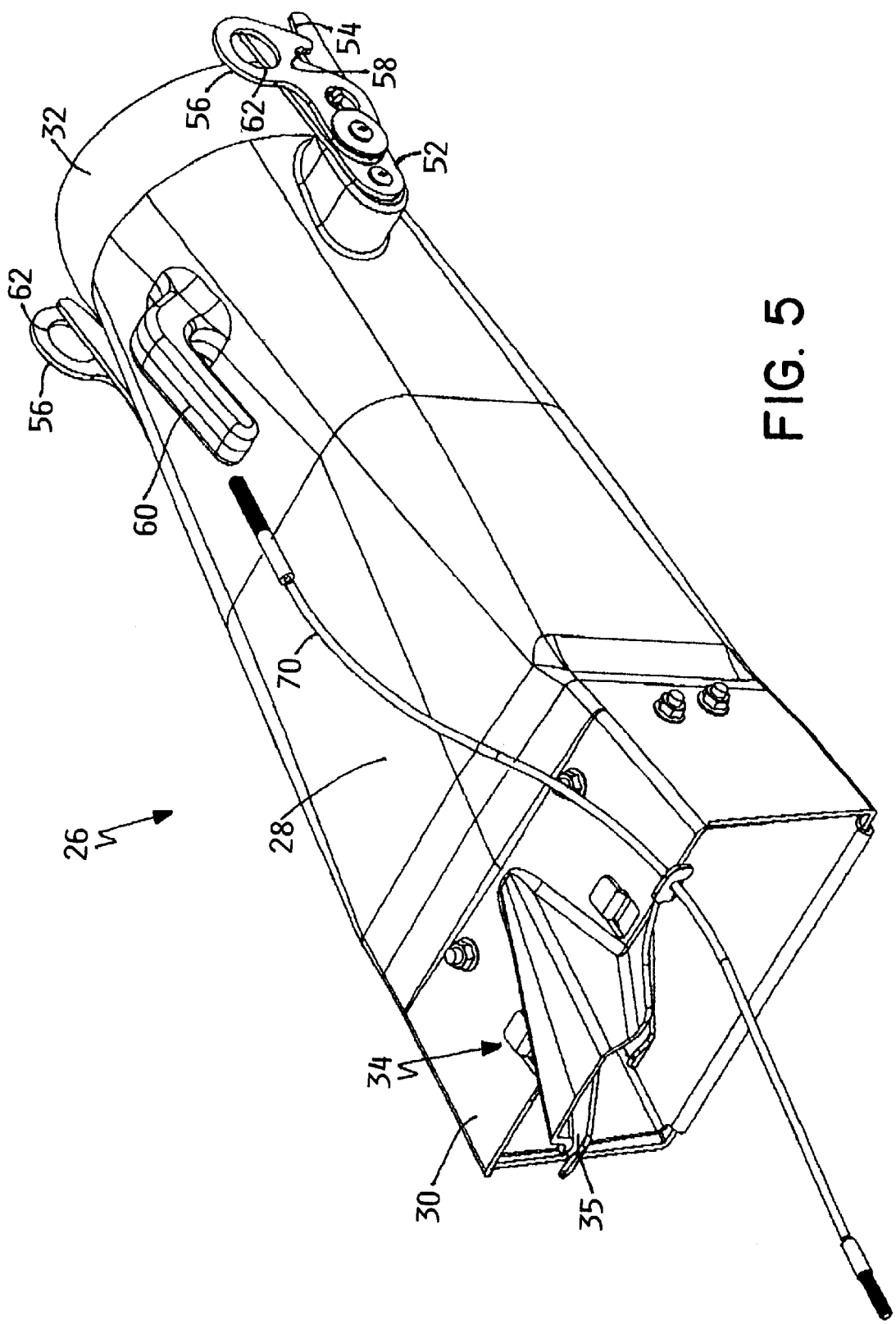
FIG. 5 is a perspective view of the plenum used to connect the grass discharge outlet on the cutting deck to the blower housing on the mower.

Referring to FIGS. 3 and 4, as cutting deck 4 is tilted from its transport or service position into its operating position, the rear of cutting deck 4 will approach plenum 26 with the rear of cutting deck 4 rolling on the ground by virtue of rear guide wheels 14. Guide pin 44 will be moved up into engagement with cam 35 and will enter into V-shaped slot portion 36. If there is any lateral misalignment between cutting deck 4 and plenum 26, i.e. guide pin 44 engages one side or the other of V-shaped slot portion 36, the angled sides of V-shaped slot portion 36 will cam or move cutting deck 4 over until guide pin 44 is aligned with straight slot portion 38. Further movement of cutting deck 4 towards plenum 26 will cause guide pin 44 to enter straight slot portion 38 as cutting deck 4 reaches its operating position. Thus, guide 34 formed by cam 35 and guide pin 44 causes grass discharge outlet 20 on cutting deck 4 to smoothly nest within plenum inlet 30 as cutting deck 4 is tilted downwardly into its operating position, even if cutting deck 4 is initially misaligned relative to plenum 26.

Plenum 26 is also easily and quickly releasable from blower 22 in order to facilitate clearing any plugs that might occur in plenum 26 or blower inlet 24. Each side of blower 22 has a mounting pin 50 that extends laterally to one side of blower 22. Each side of plenum 26 has an attachment flange 52 adjacent plenum outlet 32. Attachment flange 52 includes a V-shaped, rearwardly facing mounting slot 54 into which one of the mounting pins 50 can be received.

A gravity operated latch 56 is pivotally mounted on each attachment flange 52. The engagement of one of the mounting pins 50 against gravity operated latch 56 will cam latch 56 up out of the way of mounting pin 50 to allow mounting pin 50 to enter slot 54 on attachment flange 52. See the phantom line illustration of this in FIG. 7. However, once mounting pin 50 is fully received in slot 54, latch 56 will pivot downwardly under the force of gravity so that a downwardly facing locking groove 58 on latch 56 will seat around mounting pin 50 to lock plenum 26 to blower inlet 24.

The top of plenum 26 includes a handle 60 for allowing the operator of mower 2 to lift and manipulate plenum 26. If the operator wishes to engage plenum outlet 32 with blower inlet 24, all that needs to be done is to push plenum outlet 32 against blower inlet 24 by holding handle 60 and by moving handle 60 rearwardly towards blower inlet 24. As plenum 26 moves back against blower inlet 24, plenum 26 will automatically engage and be connected to blower 22 as the mounting pin 50 on each side of blower 22 will first cam the corresponding gravity operated latch 56 up out of the way and will then pass back into slot 54 on attachment flange 52. Once mounting pin 50 is fully received in slot 54, gravity operated latches 56 will swing down and engage over the outer ends of mounting pins 50 to lock plenum 26 to blower 22.

Figure 7:
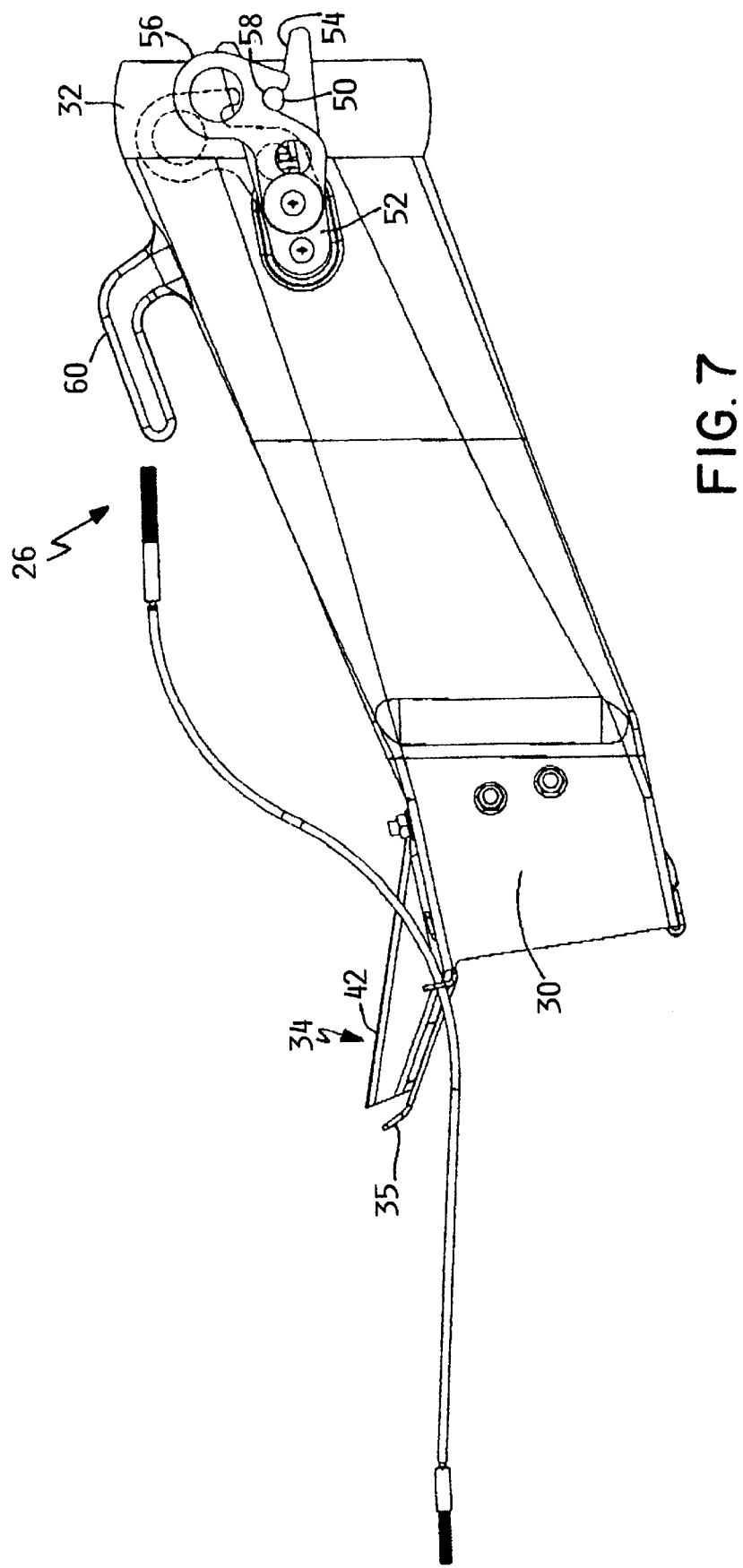
FIG. 7 is a side elevational view of the plenum shown in FIG. 5, particularly illustrating the attachment flange on one side of the plenum receiving one of the laterally extending mounting pins on the blower.

If the operator wishes to remove plenum 26 from blower 22, gravity operated latches 56 on either side are lifted up by pulling up on gravity operated latches 56 until gravity operated latches 56 are manually placed into their phantom line position shown in FIG. 7. Apertures 62 are provided on latches 56 to allow the operator to insert one or more fingers on each of the operator's hands into apertures 62 to allow the operator to better grip latches 56. In any event, once the operator lifts up on latches 56 to disengage latches 56 from mounting pins 50, the operator, with his fingers still engaged in apertures 62, can then simply pull away from blower 22 to slide plenum outlet 32 out of blower inlet 24. Accordingly, plenum 26 can be quickly and easily installed and removed from blower inlet 24 without the need for any tools.

Plenum 26 of this invention, being a separate part, provides various advantages over prior art structures. For one thing, cutting deck 4 now separates from the front of plenum 26 rather than having a plenum which is attached to cutting deck 4 which must then engage directly into blower inlet 24. As a result, the separation joint is now between cutting deck 4 and the front of plenum 26 and is moved forwardly into a more visible and accessible area on mower 2. Thus, the task of engaging grass discharge outlet 20 on cutting deck 4 with plenum 26 is easier.

In addition, guide 34 between cutting deck 4 and plenum 26 also eases the task of engaging grass discharge outlet 20 on cutting deck 4 to plenum 26 as it corrects for any possible misalignment between cutting deck 4 and plenum 26.

Finally, the use of a plenum 26 which is separable from blower inlet 24 using gravity operated latches 56 means plenum 26 can be easily and quickly removed without any tools. Thus, if a grass plug develops in plenum 26 or blower inlet 24, plenum 26 can be quickly removed to clear the plug.

When cutting deck 4 disengages plenum 26, plenum 26 will have a natural tendency to pivot downwardly as the connection or joint made between plenum outlet 32 and blower inlet 24 is a pivotal one, i.e. plenum 26 can pivot around mounting pins 50 if the front of plenum 26 is not supported. Thus, plenum 26 could pivot downwardly and strike the floor of the trailer on which mower 2 is being transported. To prevent this, a flexible tether 70 extends between plenum 26 and cutting deck 4 which tether is not taut when cutting deck 4 is in its operating position. However, tether 70 becomes more taut when deck 4 is moved into its upright transport or service position and serves to prevent plenum 26 from unduly pivoting downwardly relative to blower 22. See FIG. 1.

Various modifications of this invention will be apparent to those skilled in the art. Thus, the scope of this invention is to be limited only by the appended claims.

We claim:

1. A mower, which comprises:
  (a) a frame;
  (b) a tiltable cutting deck coupled to the frame, the cutting deck being tiltable between a generally horizontal operating position and a generally vertical transport or service position as the cutting deck remains coupled to the frame, the cutting deck having a grass discharge outlet;
  (c) a blower having a blower inlet carried on the frame; and
  (d) a plenum for connecting the cutting deck and the blower, the plenum having a plenum inlet that is coupled to the grass discharge outlet of the cutting deck and a plenum outlet that is coupled to the blower inlet when the cutting deck is in the operating position, the grass discharge outlet automatically disengaging the plenum inlet whenever the cutting deck is moved from its operating position to its transport or service position while the plenum outlet remains coupled to the blower inlet.

2. The mower of claim 1, wherein the grass discharge outlet is a duct protruding rearwardly from the cutting deck, and wherein the grass discharge outlet and plenum inlet are telescopically coupled to one another when the cutting deck is in the operating position.

3. The mower of claim 2, wherein the grass discharge outlet is telescopically received inside the plenum inlet, and wherein the plenum inlet is tapered outwardly as the plenum inlet extends forwardly to facilitate nesting of the grass discharge outlet within the plenum inlet.

4. The mower of claim 3, further including a guide coacting between the plenum and the cutting deck for helping align the grass discharge outlet on the cutting deck with the plenum inlet as the cutting deck is moved towards and into the operating position.

5. The mower of claim 4, wherein the guide includes a guide pin receivable in a slot having a V-shaped portion and a straight portion, the engagement of the guide pin with the V-shaped slot portion camming the pin into alignment for thereafter entering the straight slot portion.

6. The mower of claim 5, wherein the guide pin is on the cutting deck and the slot is on the plenum.

7. The mower of claim 6, wherein the guide pin is on the grass discharge outlet of the cutting deck and the slot is on the plenum overlying the plenum inlet.

8. The mower of claim 1, wherein the plenum outlet is releasably coupled to the blower inlet by mounting pins receivable in slots, the mounting pins being carried on one of the plenum and the blower and the slots being carried on the other of the plenum and the blower.

9. The mower of claim 8, further including latches cooperable with the mounting pins for locking the plenum outlet to the blower inlet, the latches being manually releasable to allow the plenum to be disengaged from the blower inlet.

10. The mower of claim 9, wherein the latches are pivotally carried adjacent the slots and swing by gravity down into a locking engagement with the mounting pins after the mounting pins are received in the slots.

11. The mower of claim 10, wherein the latches are configured and positioned to be cammed up out of the way of the slots when the mounting pins enter the slots by virtue of the engagement between the mounting pins and the slots.

12. The mower of claim 8, wherein the plenum includes a top handle for allowing the plenum to be grabbed and manipulated.

13. The mower of claim 1, wherein the plenum is separate from both the cutting deck and the blower.

14. A mower, which comprises:
  (a) a frame;
  (b) a tiltable cutting deck coupled to the frame, the cutting deck being tiltable between a generally horizontal operating position and a generally vertical transport or service position, the cutting deck having a grass discharge outlet;
  (c) a blower having a blower inlet carried on the frame;
  (d) a plenum for connecting the cutting deck and the blower, the plenum having a plenum inlet that is coupled to the grass discharge outlet of the cutting deck and a plenum outlet that is coupled to the blower inlet when the cutting deck is in the operating position, the grass discharge outlet disengaging the plenum inlet when the cutting deck is moved from its operating position to its transport or service position while the plenum outlet remains coupled to the blower inlet; and (e) a guide coacting between the plenum and the cutting deck for helping align the grass discharge outlet on the cutting deck with the plenum inlet as the cutting deck is moved towards and into the operating position, wherein the guide includes a guide pin receivable in a slot having a V-shaped portion and a straight portion, the engagement of the guide pin with the V-shaped slot portion camming the pin into alignment for thereafter entering the straight slot portion.

15. A mower, which comprises:

(a) a frame;

(b) a tiltable cutting deck coupled to the frame, the cutting deck being tiltable between a generally horizontal operating position and a generally vertical transport or service position, the cutting deck having a grass discharge outlet;

(c) a blower having a blower inlet carried on the frame; and (d) a plenum that is separate from the cutting deck and the blower, the plenum having a plenum inlet that is coupled to the grass discharge outlet of the cutting deck and a plenum outlet that is telescopically coupled to the blower inlet when the cutting deck is in the operating position, and the plenum outlet being releasably coupled to the blower inlet by mounting pins receivable in slots as the plenum outlet and blower inlet are telescopically coupled to one another, the mounting pins being carried on one of the plenum and the blower and the slots being carried on the other of the plenum and the blower.

16. The mower of claim 15, further including latches cooperable with the mounting pins for locking the plenum outlet to the blower inlet, the latches being manually releasable to allow the plenum to be disengaged from the blower inlet.

17. The mower of claim 16, wherein the latches are pivotally carried adjacent the slots and swing by gravity down into a locking engagement with the mounting pins after the mounting pins are received in the slots.

18. The mower of claim 17, wherein the latches are configured and positioned to be cammed up out of the way of the slots when the mounting pins enter the slots by virtue of the engagement between the mounting pins and the slots.

19. The mower of claim 15, wherein the slots and latches are carried on the plenum and the mounting pins are carried on the blower.

20. A mower, which comprises:

(a) a frame having a cutting deck which is tiltable relative to the frame, wherein the cutting deck has a substantially horizontal operating position and a generally upright transport or service position, the cutting deck tilting to move between the operating and transport or service positions;

(b) a blower carried on the frame;

(c) a plenum having a front and a rear;

(d) a grass discharge outlet on the cutting deck telescopically inserted into the front of the plenum as the cutting deck is moved into its operating position;

(e) a guide pin received in a slot having a V-shaped portion and a straight portion to correct misalignment between the cutting deck and the front of the plenum as the grass discharge outlet and the front of the plenum telescope together; and (f) the rear of the plenum being manually releasable from the blower inlet using manually releasable, hand operated latches.

* * * * *